US009865450B2

(12) United States Patent
Konrad et al.

(10) Patent No.: US 9,865,450 B2
(45) Date of Patent: Jan. 9, 2018

(54) LOW-PRESSURE DISCHARGE LAMP WITH FLUORESCENT PARTICLES HAVING A SMALL PARTICLE SIZE

(71) Applicant: OSRAM GmbH, München (DE)

(72) Inventors: Armin Konrad, Großaitingen (DE); Renate Hirrle, Augsburg (DE); Markus Schönheits, Augsburg (DE); Alexander Bothe, München (DE); Frauke Philipp, Augsburg (DE); Thomas Huckenbeck, Augsburg (DE)

(73) Assignee: LEDVANCE GmbH (DE)

( * ) Notice: Subject to any disclaimer, the term of this patent is extended or adjusted under 35 U.S.C. 154(b) by 0 days.

(21) Appl. No.: 15/122,561

(22) PCT Filed: Feb. 4, 2015

(86) PCT No.: PCT/EP2015/052274
§ 371 (c)(1),
(2) Date: Aug. 30, 2016

(87) PCT Pub. No.: WO2015/132030
PCT Pub. Date: Sep. 11, 2015

(65) Prior Publication Data
US 2017/0076933 A1 Mar. 16, 2017

(30) Foreign Application Priority Data
Mar. 6, 2014 (DE) .................. 10 2014 204 172

(51) Int. Cl.
*H01J 61/44* (2006.01)
*H01J 61/72* (2006.01)
(Continued)

(52) U.S. Cl.
CPC .......... *H01J 61/44* (2013.01); *C09K 11/7777* (2013.01); *C09K 11/7787* (2013.01);
(Continued)

(58) Field of Classification Search
CPC .. H01J 61/44; H01J 61/16; H01J 61/35; H01J 61/72
See application file for complete search history.

(56) References Cited

U.S. PATENT DOCUMENTS

| 4,447,756 A | 5/1984 | Kohmoto et al. |
| 2008/0197762 A1 | 8/2008 | Ohmi et al. |

(Continued)

FOREIGN PATENT DOCUMENTS

| CN | 1236182 A | 11/1999 |
| CN | 102315077 A | 1/2012 |

(Continued)

OTHER PUBLICATIONS

Sep. 6, 2016—(PCT) International Preliminary Report on Patentability and English translation, App. No. PCT/EP2015/052274, 32 pages.

(Continued)

*Primary Examiner* — Anne Hines
(74) *Attorney, Agent, or Firm* — Hayes Soloway PC

(57) ABSTRACT

In different embodiments, a low-pressure discharge lamp (1) is provided. The low-pressure discharge lamp has a discharge vessel (2) and a coating structure (7). The coating structure is formed on an inner face of the discharge vessel (2). The coating structure (7) has first fluorescent particles (34) which have at least one fluorescent substance that emits red light and the average particle size of which ranges from 0.5 μm to 1.9 μm, second fluorescent particles (36) which have at least one fluorescent substance that emits green light and the average particle size of which ranges from 0.6 μm to 2.8 μm or from 1 μm to 4 μm, and third fluorescent particles (38) which have at least one fluorescent substance that emits blue light and the average particle size of which ranges from 1 μm to 4 μm.

13 Claims, 9 Drawing Sheets

Figure 1:
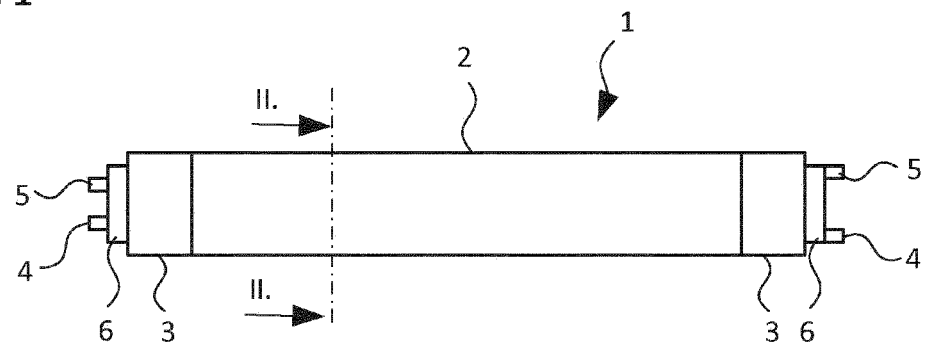

(51) Int. Cl.
 C09K 11/77 (2006.01)
 H01J 61/16 (2006.01)
 H01J 61/35 (2006.01)
(52) U.S. Cl.
 CPC .............. *H01J 61/16* (2013.01); *H01J 61/35* (2013.01); *H01J 61/72* (2013.01); *H01J 2261/385* (2013.01)

(56) References Cited

U.S. PATENT DOCUMENTS

| | | | | |
|---|---|---|---|---|
| 2012/0286645 A1* | 11/2012 | Cohen | ..................... | H01J 61/44 313/487 |
| 2013/0140980 A1* | 6/2013 | Deme | ..................... | H01J 61/35 313/489 |

FOREIGN PATENT DOCUMENTS

| | | | |
|---|---|---|---|
| JP | 2003027051 A | 1/2003 | |
| JP | 2003272559 A | 9/2003 | |
| JP | 2005310537 A | 11/2005 | |

OTHER PUBLICATIONS

International Search Report and Written Opinion in corresponding International Application No. PCT/EP2015/052274 dated Aug. 31, 2015 (21 pages—English Translation included).

* cited by examiner

FIG 7

| Fluorescent substance | Activator | | First range | | Second range | | Third range | |
|---|---|---|---|---|---|---|---|---|
| | | | Lower limit | Upper limit | Lower limit | Upper limit | Lower limit | Upper limit |
| $BaMgAl_{10}O_{17}:Eu$ | $Eu2+$ | mol-% | 3.0 | 11.0 | 3.0 | 7.0 | 3.0 | 6.5 |
| $Y_2O_3:Eu$ | $Eu3+$ | mol-% | 2.3 | 5.5 | 2.3 | 4.8 | 2.3 | 4.5 |
| $LaPO_4:Ce,Tb$ | $Tb3+$ | mol-% | 6.5 | 16.0 | 6.5 | 15.5 | 6.5 | 15.0 |
| $CeMgAl_{11}O_{19}:Tb$ | $Tb3+$ | mol-% | 20 | 50 | 20 | 48 | 20 | 43 |

FIG 8

Light yield > 85 lm/W and lamp current 290 mA - 800 mA, or light yield > 95 lm/W and lamp current 140 mA - 290 mA

| | Activator | Mol / Lamp | First range | | Second range | | Third range | |
|---|---|---|---|---|---|---|---|---|
| Fluorescent particles emitting red/blue light | Eu | 9.97E-05 | 5.36E-05 | 1.32E-04 | 5.36E-05 | 1.11E-04 | 5.36E-05 | 1.05E-04 |
| Fluorescent particles emitting green light | Tb | 1.80E-04 | 8.49E-05 | 2.07E-04 | 8.49E-05 | 2.01E-04 | 8.49E-05 | 1.94E-04 |

Light yield > 95 lm/W and lamp current 290 mA -800 mA. or light yield > 105 lm/W and lamp current140 mA - 290 mA

| | Activator | Mol / Lamp | First range | | Second range | | Third range | |
|---|---|---|---|---|---|---|---|---|
| Fluorescent particles emitting red/blue light | Eu | 1.55E-04 | 8.33E-05 | 2.05E-04 | 8.33E-05 | 1.73E-04 | 8.33E-05 | 1.63E-04 |
| Fluorescent particles emitting green light | Tb | 2.81E-04 | 1.32E-04 | 3.22E-04 | 1.32E-04 | 3.12E-04 | 1.32E-04 | 3.03E-04 |

Light yield > 70 lm/W and lamp current 290 mA -800 mA. or light yield > 85 lm/W and lamp current 140 mA - 290 mA

| | Activator | Mol / Lamp | First range | | Second range | | Third range | |
|---|---|---|---|---|---|---|---|---|
| Fluorescent particles emitting red/blue light | Eu | 7.75E-05 | 4.17E-05 | 1.02E-04 | 4.17E-05 | 8.67E-05 | 4.17E-05 | 8.13E-05 |
| Fluorescent particles emitting green light | Tb | 1.40E-04 | 6.60E-05 | 1.61E-04 | 6.60E-05 | 1.56E-04 | 6.60E-05 | 1.51E-04 |

FIG 9

Light yield > 85 lm/W and lamp current 290 mA-800mA, or light yield >95 lm/W and lamp current 140 mA-290 mA

|  | Activator | Mol / Lamp | First range | | Second range | | Third range | |
|---|---|---|---|---|---|---|---|---|
| Fluorescent particles emitting red/blue light | Eu | 9.97E-05 | 5.36E-05 | 1.32E-04 | 5.36E-05 | 1.11E-04 | 5.36E-05 | 1.05E-04 |
| Fluorescent particles emitting green light | Tb | 1.38E-04 | 6.51E-05 | 1.59E-04 | 6.51E-05 | 1.54E-04 | 6.51E-05 | 1.49E-04 |

Light yield > 95 lm/W and lamp current 290 mA -800 mA. or light yield > 105 lm/W and lamp current 140 mA - 290 mA

|  | Activator | Mol / Lamp | First range | | Second range | | Third range | |
|---|---|---|---|---|---|---|---|---|
| Fluorescent particles emitting red/blue light | Eu | 1.55E-04 | 1.60E-04 | 3.84E-04 | 1.60E-04 | 3.31E-04 | 1.60E-04 | 3.10E-04 |
| Fluorescent particles emitting green light | Tb | 2.15E-04 | 1.01E-04 | 2.47E-04 | 1.01E-04 | 2.40E-04 | 1.01E-04 | 2.32E-04 |

Light yield > 70 lm/W and lamp current 290 mA -800 mA. or light yield 85 lm/W and lamp current 140 mA - 290 mA

|  | Activator | Mol / Lamp | First range | | Second range | | Third range | |
|---|---|---|---|---|---|---|---|---|
| Fluorescent particles emitting red/blue light | Eu | 7.75E-05 | 7.99E-05 | 1.92E-04 | 7.99E-05 | 1.65E-04 | 7.99E-05 | 1.55E-04 |
| Fluorescent particles emitting green light | Tb | 1.08E-04 | 5.06E 05 | 1.24E-04 | 5.06E-05 | 1.20E-04 | 5.06E-05 | 1.16E 04 |

FIG 10

Light yield > 85 lm/W and lamp current 290 mA- 800mA, or light yield >95 lm/W and lamp current 140 mA-290 mA

|  | Activator | Mol / Lamp | First range | | Second range | | Third range | |
| --- | --- | --- | --- | --- | --- | --- | --- | --- |
| Fluorescent particles emitting red/blue light | Eu | 1.23E-04 | 6.62E-05 | 1.63E-04 | 6.62E-05 | 1.38E-04 | 6.62E-05 | 1.29E-01 |
| Fluorescent particles emitting green light | Tb | 1.59E-04 | 7.49E-05 | 1.83E-04 | 7.49E-05 | 1.77E-04 | 7.49E-05 | 1.72E-04 |

Light yield > 95 lm/W and lamp current 290 mA -800 mA. or light yield > 105 lm/W and lamp current 140 mA - 290 mA

|  | Activator | Mol / Lamp | First range | | Second range | | Third range | |
| --- | --- | --- | --- | --- | --- | --- | --- | --- |
| Fluorescent particles emitting red/blue light | Eu | 1.92E-04 | 1.03E-04 | 2.53E-04 | 1.03E-04 | 2.14E-04 | 1.03E-04 | 2.01E-04 |
| Fluorescent particles emitting green light | Tb | 2.48E-04 | 1.17E-04 | 2.85E-04 | 1.17E-04 | 2.76E-04 | 1.17E-04 | 2.67E-04 |

Light yield > 70 lm/W and lamp current 290 mA -800 mA. or light yield 85 lm/W and lamp current 140 mA - 290 mA

|  | Activator | Mol / Lamp | First range | | Second range | | Third range | |
| --- | --- | --- | --- | --- | --- | --- | --- | --- |
| Fluorescent particles emitting red/blue light | Eu | 9.58E-05 | 5.156-05 | 1.27E-04 | 5.15E-05 | 1.07E-04 | 5.15E-05 | 1.00E-01 |
| Fluorescent particles emitting green light | Tb | 1.24E-04 | 5.83E-05 | 1.42E-04 | 5.83E-05 | 1.38E-04 | 5.83E-05 | 1.34E-04 |

FIG 11

Light yield > 85 lm/W and lamp current 290 mA- 800mA, or light yield >95 lm/W and lamp current 140 mA-290 mA

| | Activator | Mol / Lamp | First range | | Second range | | Third range | |
|---|---|---|---|---|---|---|---|---|
| Fluorescent particles emitting red/blue light | Eu | 1.07E-04 | 5.73E-05 | 1.41E-04 | 5.73E-05 | 1.19E-04 | 5.73E-05 | 1.12E-04 |
| Fluorescent particles emitting green light | Tb | 2.57E-04 | 1.21E-04 | 2.95E-04 | 1.21E-04 | 2.86E-04 | 1.21E-04 | 2.77E-04 |

Light yield > 95 lm/W and lamp current 290 mA -800 mA, or light yield > 105 lm/W and lamp current 140 mA - 290 mA

| | Activator | Mol / Lamp | First range | | Second range | | Third range | |
|---|---|---|---|---|---|---|---|---|
| Fluorescent particles emitting red/blue light | Eu | 1.66E-04 | 8.91E-05 | 2.19E-04 | 8.91E-05 | 1.85E-04 | 8.91E-05 | 1.74E-0 |
| Fluorescent particles emitting green light | Tb | 4.00E-04 | 1.88E-04 | 4.60E-04 | 1.88E-04 | 4.45E-04 | 1.88E-04 | 4.31E-0 |

Light yield > 70 lm/W and lamp current 290 mA -800 mA. or light yield 85 lm/W and lamp current 140 mA - 290 mA

| | Activator | Mol / Lamp | First range | | Second range | | Third range | |
|---|---|---|---|---|---|---|---|---|
| Fluorescent particles emitting red/blue light | Eu | 8.29E-05 | 4.46E-05 | 1.10E-04 | 4.46E-05 | 9.27E-05 | 4.46E-05 | 8.70E-05 |
| Fluorescent particles emitting green light | Tb | 2.00E-04 | 9.41E-05 | 2.30E-04 | 9.41E-05 | 2.23E-04 | 9.41E-05 | 2.16E-04 |

LOW-PRESSURE DISCHARGE LAMP WITH FLUORESCENT PARTICLES HAVING A SMALL PARTICLE SIZE

CROSS-REFERENCE TO RELATED APPLICATIONS

This application is the U.S. national phase entry under 35 U.S.C. §371 of International Application No. PCT/EP2015/052274, filed on Feb. 4, 2015, which claims priority to German Patent Application No. 10 2014 204 172.4, filed on Mar. 6, 2014.

DESCRIPTION

The invention concerns a low-pressure discharge lamp.

Conventional low-pressure discharge lamps, for example fluorescent lamps and/or compact fluorescent lamps, have discharge vessels. Such a discharge vessel is for example a glass vessel and/or a discharge tube which for example may comprise one, two or more U-shaped, straight and/or tubular vessel regions. On its insides, the discharge vessel may have a coating structure. Furthermore, a low-pressure discharge lamp may have an electronic ballast.

The coating structure may for example comprise a protective coating directly on the discharge vessel and a fluorescent coating on the protective coating. The protective coating serves for example to screen an environment of the low-pressure discharge lamp from UV radiation, to reflect UV radiation back into the discharge vessel, and to prevent the diffusion of mercury into the material of the discharge vessel. The fluorescent coating has fluorescent substances in the form of fluorescent particles for converting electromagnetic radiation into coloured light, wherein the coloured light can be mixed so that, in operation, the low-pressure discharge lamp emits white light. The protective coating and/or the fluorescent coating may be formed in the discharge vessel for example by the application of a suspension or slurry containing fluorescent particles into the discharge vessel.

In addition, a gas and a low quantity of mercury may be added to the coated discharge vessel. At room temperature, when the discharge lamp is switched off, the mercury in the interior of the discharge vessel may be partly gaseous and partly liquid, and form a small droplet. When the discharge lamp is switched on, an electric current passes through the gas in the coated discharge vessel so that the mercury is heated, becomes gaseous and in the gaseous state begins to emit the electromagnetic radiation, in particular UV radiation, by means of which the fluorescent particles are excited to emit light.

The fluorescent particles may be embedded in a carrier material. The fluorescent substances may generate visible light by excitation with the shortwave light through to UV radiation, for example the UV radiation of the mercury. The light phenomena are based for example on fluorescence or phosphorescence. The fluorescent particles comprise or are formed from the fluorescent substances. The fluorescent particles or fluorescent substances may for example have crystalline host lattices, the lattice sites of which are partly occupied by activators. In other words, the host lattice may be doped with the activators. The activator, i.e. the doping element, determines the colour of the generated light. The activators may for example comprise or be formed from rare earth metals.

To generate white light with predefined optical properties, for example a predefined colour temperature, the predefined luminous flux and/or a predefined light yield, known fluorescent coatings are formed with coating thicknesses which do not fall below a minimum thickness. The minimum thicknesses require minimum quantities and/or minimum proportions of fluorescent particles and consequently activators in the corresponding fluorescent coatings.

Known fluorescent particles have particle sizes which for example lie in a range between 2.2 µm and 5 µm for fluorescent substances emitting red light, in a range between 3.2 µm and 6 µm for fluorescent substances emitting green light, for example for lanthanum-phosphate:cerium,terbium, and for example in a range between 5 µm and 7 µm for fluorescent substances emitting blue light.

Fluorescent particles with a small mean particle size have larger surface areas relative to the volume and there is a general prejudice to the effect that relatively many contaminants can be deposited on these larger surfaces, and that relatively many contaminants are associated with smaller mean particle sizes. The electromagnetic radiation in the fluorescent particles with smaller mean particle sizes has a shorter wavelength and there is a general prejudice to the effect that this leads to a lower efficiency of the fluorescent substances, for example because of the lower absorption probability in the fluorescent particles caused by the short wavelength and the increased probability of radiationless recombination due to the enlarged surface proportion of the fluorescent particles. In particular, the energy is transferred to the lattice and recombines as visible radiation, whereas at the interfaces such as the surfaces of the fluorescent particles, radiationless recombination occurs. Furthermore there is a general prejudice to the effect that for the above reasons, doping with activators must be increased in order to create a low-pressure discharge lamp with conventional optical properties, which would however lead to higher costs. Therefore highly efficient fluorescent substances, i.e. fluorescent substances with high quantum efficiency, in the form of fluorescent particles with smaller mean particle size, are not known in low-pressure discharge lamps.

The minimum thicknesses of the fluorescent coatings and the lower limits for the mean particle size lead to minimum quantities of activators, in particular rare earth metals, depending on the size of the low-pressure discharge lamp. These are relatively costly however and lead to relatively high minimum costs for low-pressure discharge lamps.

In various embodiments, a low-pressure discharge lamp is provided which can be produced economically and/or fulfils the predefined optical properties.

In various embodiments, a low-pressure discharge lamp is provided. The low-pressure discharge lamp has a discharge vessel and a coating structure. The coating structure is formed on an inside of the discharge vessel. The coating structure comprises first fluorescent particles which have a least one fluorescent substance emitting red light and the mean particle size and in particular the d50 value of which lies in a range from 0.5 µm to 1.9 µm, second fluorescent particles which have at least one fluorescent substance emitting green light and the mean particle size and in particular the d50 value of which lies in a range from 0.6 µm to 2.8 µm or from 1 µm to 4 µm, and third fluorescent particles which have at least one fluorescent substance emitting blue light and the mean particle size and in particular the d50 value of which lies in a range from 1 µm to 4 µm.

The small mean particle sizes allow, even in a particularly small coating thickness which is smaller than the minimum thicknesses of the known fluorescent substances, the formation of a closed fluorescent coating. Contrary to the generally existing prejudices, the small mean particle sizes of the fluorescent particles surprisingly allow, even with the particularly thin fluorescent coating, the achievement of the predefined optical properties, in particular a predefined colour temperature, a predefined luminous flux and/or a predefined light yield. The predefined optical properties, contrary to the generally existing prejudices, can surprisingly be achieved in particular without increasing the doping level with activators and/or a percentage proportion of activators relative to the fluorescent substances. Because of the constant doping level or percentage proportion of activators and the low coating thickness required, the necessary minimum quantity of activators, in particular rare earth metals, is reduced, which means that the low-pressure discharge lamps can be produced particularly economically.

The second fluorescent particles which have the fluorescent substance emitting green light, and the mean particle size and in particular the d50 value of which lies in the range from 0.6 µm to 2.8 µm, may comprise as fluorescent substance for example $LaPO_4:Ce,Tb$ or $LaPO_4:Tb$ (LAP). The second fluorescent particles comprising the fluorescent substance emitting green light, and the mean particle size and in particular d50 value of which lies in the range from 1 µm to 4 µm, may for example comprise as fluorescent substance $CeMgAl_{11}O_{19}:Tb$ (CAT).

In various embodiments, the mean particle size and in particular the d50 value of the first fluorescent particles emitting red light lies in a range from 1.2 µm to 1.7 µm. Alternatively or additionally, the mean particle size and in particular the d50 value of the second fluorescent particles emitting green light lies in a range from 1 µm to 2.5 µm or from 1.5 µm to 3.5 µm. Alternatively or additionally, the mean particle size and in particular the d50 value of the third fluorescent particles emitting blue light lies in a range from 1.5 µm to 3.5 µm. The second fluorescent particles emitting green light, the mean particle size and in particular the d50 value of which lie in the range from 1 µm to 2.5 µm, may comprise as fluorescent substance for example $LaPO_4:Ce,Tb$ or $LaPO_4:Tb$. The second fluorescent particles emitting green light, the mean particle size and in particular the d50 value of which lie in the range from 1.5 µm to 3.5 µm, may comprise as fluorescent substance CAT for example.

In various embodiments, the mean particle size and in particular the d50 value of the second fluorescent particles emitting green light lies in a range from 1.7 µm to 2.3 µm or from 2.0 µm to 3.4 µm. Alternatively or additionally, the mean particle size and in particular the d50 value of the third fluorescent particles emitting blue light lies in a range from 2.5 µm to 3.3 µm. The second fluorescent particles, the mean particle size and in particular the d50 value of which lie in the range from 1.7 µm to 2.3 µm, may comprise as fluorescent substance for example $LaPO_4:Ce,Tb$ or $LaPO_4:Tb$. The second fluorescent particles, the mean particle size and in particular the d50 value of which lie in the range from 2 µm to 3.4 µm, may comprise as fluorescent substance CAT for example.

In various embodiments, the fluorescent substances comprise host lattices doped with the activators. In other words, the fluorescent particles or fluorescent substances are formed crystalline, wherein the lattice sites of the crystal structures are partially occupied by activators.

In various embodiments, the proportion of the activators in the fluorescent substance emitting green light lies in the range from 6.5 mol % to 16 mol % or from 20 mol % to 50 mol %. Alternatively or additionally, the proportion of the activators in the fluorescent substance emitting red light lies in the range from 2.3 mol % to 5.5 mol %. Alternatively or additionally, the proportion of the activators in the fluorescent substance emitting blue light lies in the range from 3.0 mol % to 11.0 mol %. For example, the proportion of activators in the fluorescent substance emitting green light, $LaPO_4:Ce,Tb$ or $LaPO_4:Tb$, lies in the range from 6.5 mol % to 16 mol %. For example, the proportion of activators in the fluorescent substance emitting green light, CAT, lies in the range from 20 mol % to 50 mol %. The proportion of activators in each case relate to a mol of the corresponding fluorescent substance.

In various embodiments, a quantity of activators per 120 cm lamp length in the fluorescent substance emitting red light and the fluorescent substance emitting blue light lies in a range from $4.17*10^{-5}$ mol to $3.84*10^{-4}$ mol. Alternatively or additionally, a quantity of activators per 120 cm lamp length in the fluorescent substance emitting green light lies in a range from $5.06*10^{-5}$ mol to $4.60*10^{-4}$ mol. The quantities given may for example relate to absolute total quantities of the corresponding activator in the low-pressure discharge lamp.

The lamp length refers to a total length of the discharge vessel of the low-pressure discharge lamp. If the discharge vessel comprises several vessel parts, the lamp length corresponds to the sum of the length of the vessel parts. If the discharge vessel or vessel parts are bent so that the vessel parts are for example U-shaped and each has two straight tube portions and a bent tube portion, the lamp length corresponds to the sum of the lengths of all straight tube portions and all bent tube portions of the low-pressure discharge lamp.

Specifying the quantities of activators "per 120 cm" indicates for example that the quantities given are standardised to a 120 cm lamp length, and/or that the low-pressure discharge lamp may also have a smaller or larger lamp length, wherein then the given quantities may be converted to the corresponding lamp length and wherein the conversion takes place linearly and/or proportionally. For example, a low-pressure discharge lamp with double lamp length has twice as many activators, and a low-pressure discharge lamp with half the lamp length only has half as many activators.

The quantity of activators in the fluorescent substance emitting red light and the fluorescent substance emitting blue light is given as a sum, since the sum of the corresponding activators can easily be demonstrated in the completed low-pressure discharge lamp, in particular when both have europium as an activator.

In various embodiments, the discharge vessel has an inner diameter in the range from 13 mm to 32 mm.

In various embodiments, the same quantities of activators per lamp length may be used for various lamp configurations, for example for rod-like, bent once or spiral low-pressure discharge lamps with internal diameters of 13 mm to 32 mm. The achievable light yield is here also influenced by the respective discharge current. Thus for example a higher light yield results from a smaller discharge current.

In various embodiments, the activators comprise rare earth metals.

In various embodiments, the activators comprise europium and/or terbium.

In various embodiments, at least one of the host lattices comprises yttrium oxide.

In various embodiments, the coating structure comprises a protective coating formed on an inside of the discharge vessel, and a fluorescent coating formed on the protective coating and comprising the fluorescent particles. The protective coating serves to screen the environment of the low-pressure discharge lamp from the UV radiation generated in the low-pressure discharge lamp, to reflect UV radiation back into the discharge vessel, and to prevent a diffusion of mercury into the material of the discharge vessel, and as a carrier for the fluorescent coating. Alternatively, the coating structure may have only one coating which serves as a protective coating and fluorescent coating, and which for example is configured as a protective coating having fluorescent particles. Alternatively, the coating structure may comprise more than two, for example three, four or more layers. These additional layers may for example be further fluorescent coatings and/or further protective coatings.

In various embodiments, the protective coating comprises aluminium oxide and/or highly dispersed aluminium oxide. The highly dispersed aluminium oxide may also be called pyrogenic aluminium oxide.

In various embodiments, the low-pressure discharge lamp in operation emits white light.

In various embodiments, the low-pressure discharge lamp in operation has discharge currents in a range from 140 mA to 800 mA, for example in a range from 140 mA to 290 mA, furthermore for example in a range from 150 mA to 200 mA, and/or in a range from 290 mA to 800 mA.

In various embodiments, the light yield of the low-pressure discharge lamp lies in a range from 70 lm/W to 120 lm/W, for example in a range from 80 lm/W to 110 lm/W, for example in a range from 85 lm/W to 100 lm/W. The light yield may also be designated the efficiency of the low-pressure discharge lamp.

In various embodiments, a colour temperature of the generated light lies in a range from 2,500 K to 8,000 K, for example from 2,500 K to 3,200 K, for example from 3,500 K to 4,200 K, for example from 5,000 K to 6,500 K.

In various embodiments, the quantum efficiency of the fluorescent substances lies in a range from 80% to 100%, for example from 82% to 98%, for example from 83% to 92%. The quantum efficiency here describes the number of photons converted into visible light by a fluorescent substance to relation to the irradiated photons, i.e. the ratio between the number of emitted photons of new wavelength to the number of absorbed photons of the excitation wavelength.

The low-pressure discharge lamp may in particular be rod-like, bent once or spiral. The discharge vessel is filled for example with a filling gas mixture of argon and krypton.

The low-pressure discharge lamp may for example be a T8 L 36 W low-pressure discharge lamp to DIN 60081 which has a lamp length of for example around 120 cm. The relative mass proportion of argon is for example 25%, that of krypton for example 75%. The filling pressure is set to around 2.1 hPa, wherein here around means for example an accuracy of 0.2 hPa. The discharge vessel has an internal diameter in the range for example from 24 mm to 26 mm and a glass wall thickness of around 0.75 mm.

The low-pressure discharge lamp may for example be a T8 L 58 W low-pressure discharge lamp to DIN 60081 which has a lamp length of for example around 150 cm. The relative mass proportion of argon is for example 25%, that of krypton for example 75%. The filling pressure is set to around 2.0 hPa, wherein here around means for example an accuracy of 0.2 hPa. The discharge vessel has an internal diameter in the range for example from 24 mm to 26 mm and a glass wall thickness of around 0.75 mm.

The low-pressure discharge lamp may for example be a T5 HO 54 W low-pressure discharge lamp to DIN 60081 which has a lamp length of for example around 115 cm. The relative mass proportion of argon is for example 80%, that of krypton for example 20%. The filling pressure is set to around 2.7 hPa, wherein here around means for example an accuracy of 0.2 hPa. The discharge vessel has an internal diameter in the range for example from 13 mm to 16 mm and a glass wall thickness of around 0.6 mm.

Alternatively, the low-pressure discharge lamp may be another low-pressure discharge lamp to DIN 60081.

The low-pressure discharge lamps have in operation a lamp current in particular between 290 mA and 800 mA, such as for example a low-pressure discharge lamp type T8 L36 W which has a lamp current of 430 mA. It may have an efficiency or light yield for example greater than 70 lm/W, greater than 85 lm/W or greater than 95 lm/W. Alternatively, the low-pressure discharge lamp may have a smaller lamp current, in particular smaller than 290 mA, in particular in the range from 140 mA to 290 mA, in particular in the range from 150 mA to 200 mA, such as for example a low-pressure discharge lamp type T5 HE. Because of the lower lamp currents, a higher efficiency or higher light yield can be achieved, for example greater than 80 lm/W, greater than 95 lm/W or greater than 105 lm/W.

The light yields or efficiency figures relate to the maximum achievable efficiency relative to the mercury vapour pressure of the corresponding mercury low-pressure discharge lamp. In a T5 HE low-pressure discharge lamp with a lamp current of 170 mA, the maximum achievable efficiency may be reached for example in the range from 34° C. to 39° C. ambient temperature. For a T8 L36 W low-pressure discharge lamp with 430 mA lamp current, the maximum achievable efficiency may be reached for example in the range from 23° C. to 28° C. The temperature at which the low-pressure discharge lamps reach their maximum efficiency may be set by the design, for example by changing the length of the lamp frame, the spacing of a coil of the low-pressure discharge lamp from a vessel end of the discharge vessel, or other measures regulating mercury vapour pressure such as the use of amalgam.

Exemplary embodiments of the invention are shown in the figures and explained in more detail below.

Figure 2:
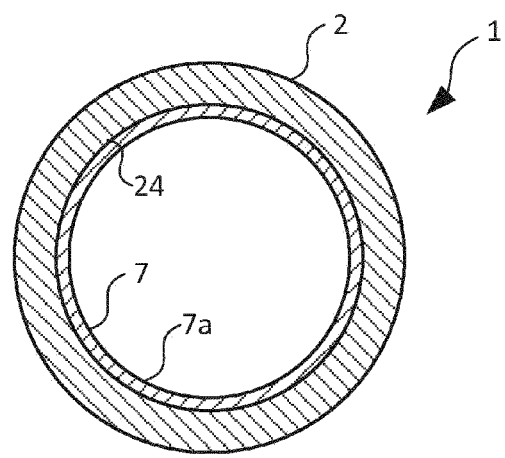
Figure 3:
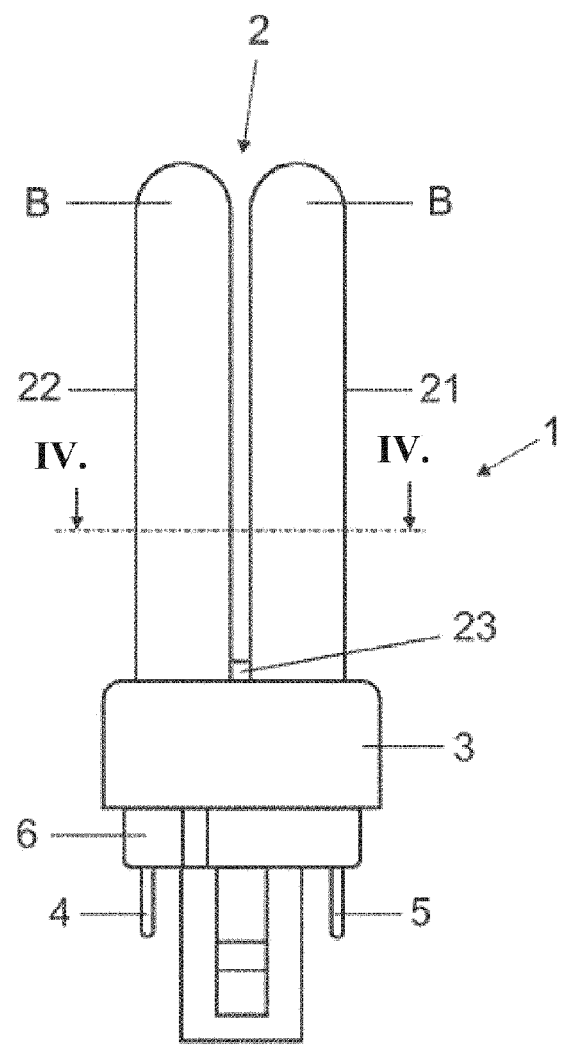
Figure 4:
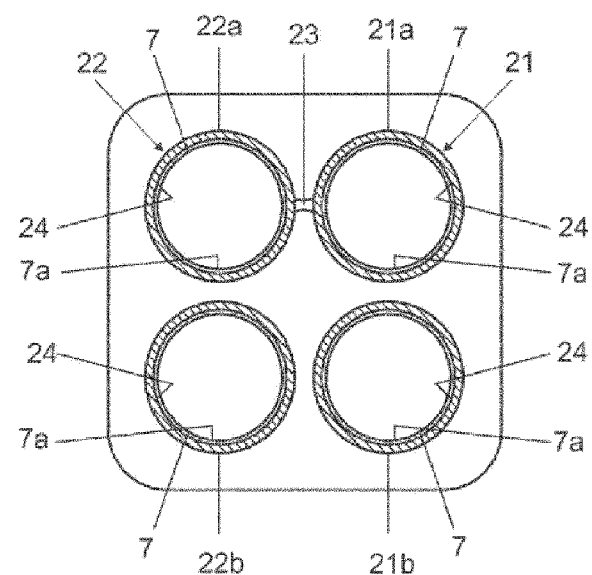
Figure 5:
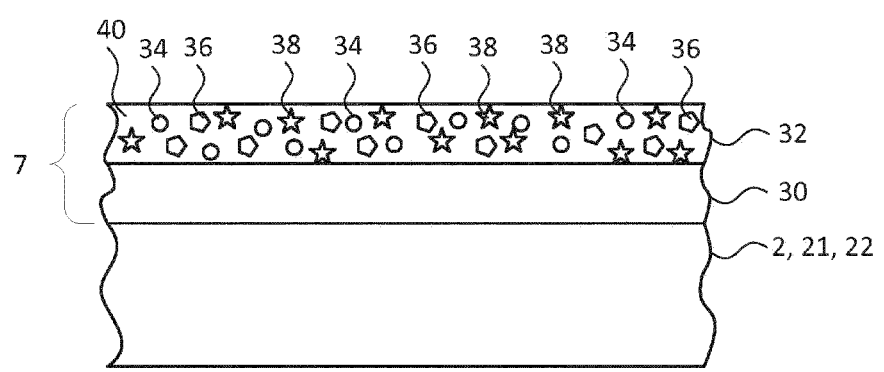
Figure 6:
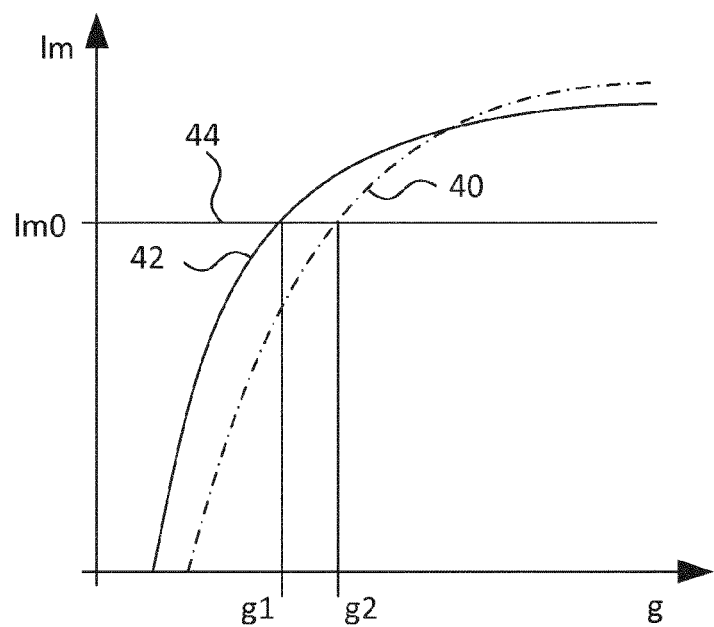

The drawings show:

FIG. 1 a side view of an exemplary embodiment of a low-pressure discharge lamp;

FIG. 2 a section view of the low-pressure discharge lamp according to FIG. 1;

FIG. 3 a side view of an exemplary embodiment of a low-pressure discharge lamp;

FIG. 4 a section view of the low-pressure discharge lamp according to FIG. 3;

FIG. 5 a detailed section view of an exemplary embodiment of a discharge vessel of a low-pressure discharge lamp;

FIG. 6 a diagram with a luminous flux-weight curve of a conventional low-pressure discharge lamp and with a luminous flux-weight curve of an exemplary embodiment of a low-pressure discharge lamp;

FIG. 7 a first table;

FIG. 8 a second table;

FIG. 9 a third table;

FIG. 10 a fourth table;

FIG. 11 a fifth table.

In the detailed description which follows, reference is made to the enclosed drawings which form part of this description and which for illustration depict specific exemplary embodiments in which the invention may be implemented. In this respect, directional terminology, such as for example "top", "bottom", "rear", "front", "behind" etc., is used with reference to the orientation of the figure(s) described. Since components of exemplary embodiments may be positioned in a number of different orientations, the directional terminology serves for illustration and is in no way restrictive. Evidently, other exemplary embodiments may be used and structural or logical changes made without deviating from the scope of protection of the present invention. Evidently, features of the various exemplary embodiments described herein may be combined with each other unless specified otherwise. The following detailed description should not therefore be interpreted restrictively, and the scope of protection of the present invention is defined by the attached claims.

In the context of this description, the terms "connected", "attached" and "coupled" are used to describe both a direct and an indirect connection, a direct or indirect attachment and a direct or indirect coupling. In the figures, identical or similar elements carry identical reference numerals where appropriate.

FIG. 1 shows a low-pressure discharge lamp 1 which comprises a discharge vessel 2 and two housings 3. The low-pressure discharge lamp 1 may for example be a fluorescent lamp. The discharge vessel 2 may for example comprise or be made from glass, for example soda-lime glass. The discharge vessel 2 may also be called a pressure discharge vessel, a light tube, discharge tube, gas discharge tube or burner. The discharge vessel 2 is for example formed rod-like and comprises a discharge chamber. The discharge vessel 2 extends with its free ends into respective housings 3. Alternatively, the discharge vessel 2 may be formed with a curvature or as a spiral, comprise two or more vessel parts and/or have only one housing 3.

Each of the housings 3 has a base 6. The low-pressure discharge lamp 1 may also be designated a double-base low-pressure discharge lamp 1. The bases 6 may also be called pin bases. From each of the bases 6, contact pins 4 and 5 protrude to supply electrical current to the low-pressure discharge lamp 1 and/or to control the low-pressure discharge lamp 1 externally. The discharge vessel 2 they be attached to the housings 3 by means of a mastic (not shown). For example, the discharge vessel 2 may be fixed to the bases 6.

FIG. 2 shows a section view of the low-pressure discharge lamp 1 according to FIG. 1 along section line II. The discharge vessel 2 has an inside 24 which extends around the discharge chamber. A coating structure 7 is formed on the inside 24 of the discharge vessel 2. The coating structure 7 has a surface 7a of the coating structure 7. The discharge vessel 2 with the coating structure 7 may also be called a coated discharge vessel 2. A lamp length of the low-pressure discharge lamp 1 corresponds to the length of the discharge vessel 2.

The discharge chamber contains a gas, for example a noble gas which in operation serves as an electron conductor and/or electron buffer. The gas may for example be argon and/or krypton. For example 4% to 100%, for example 20% to 75%, for example around 75% krypton may be used. Alternatively or additionally, for example 20% to 90%, for example 40% to 80%, for example around 25% argon may be used. Furthermore, optionally low quantities of one, two or more further gases may be present in the discharge vessel 2. The smaller quantities may for example be less than 1%, for example less than 0.1%. The gas may for example have a pressure between 1.5 hPa and 3 hPa, for example around 2 hPa. Furthermore, the discharge vessel 2 contains a small quantity of mercury.

FIG. 3 shows a low-pressure discharge lamp 1 which comprises a discharge vessel 2 and a housing 3. The low-pressure discharge lamp 1 may for example be a low-energy lamp and/or a compact fluorescent lamp. The discharge vessel 2 may for example comprise or be made of glass, for example soda-lime glass. The discharge vessel 2 may also be called a pressure discharge vessel, light tube, discharge tube, gas discharge tube or burner. The discharge vessel 2 has for example two U-shaped vessel parts 21 and 22 formed tubular in cross-section which are connected together by a web 23 and thus form a cohesive discharge chamber. The two vessel parts 21 and 22 extend with their free ends into the housing 3, in which optionally an electronic ballast (not shown) may be arranged. Alternatively, the discharge vessel 2 may comprise just one U-shaped vessel part 21 formed tubular in cross-section, with a housing 3 for example at the end of the legs of the U.

The housing 3 has a base 6. The low-pressure discharge lamp 1 may be called a single-base low-pressure discharge lamp 1. Contact pins 4 and 5 protrude from the base 6 to supply the discharge lamp 1 with electrical current and/or to control the discharge lamp 1 externally. In the upper part regions of the discharge vessel 2 shown in FIG. 3, the vessel parts 21 are formed arcuate. In the arcuate part regions of the vessel parts 21, 22, cross sections B of the vessel parts 21, 22 substantially correspond to the cross sections of the vessel parts 21 and 22 outside these arcuate part regions, for example the cross sections in the region of section line IV. The discharge vessel 2 may be attached to the housing 3 by means of a mastic (not shown). For example, the discharge vessel 2 may be fixed to the base 6.

FIG. 4 shows a section view of the discharge lamp 1 along section line VI in FIG. 3. The section view shows two tube portions 21a, 21b of the vessel part 21 and two tube portions 22a, 22b of the vessel part 22. The vessel parts 21, 22 have insides 24 of the discharge vessel 2. A coating structure 7 is formed on the insides 24 of the discharge vessel 2 and hence on the insides 24 of vessel parts 21, 22, and hence also on the insides of the tube portions 21a, 21b, 22a, 22b. The coating structure 7 has a surface 7a of the coating structure 7. The discharge vessel 2 with the coating structure 7 may be called a coated discharge vessel 2. A lamp length of the low-pressure discharge lamp 1 corresponds to a sum of the lengths of the vessel parts 21, 22 of the low-pressure discharge lamp 1. The lengths of the vessel parts 21, 22 of the low-pressure discharge lamp 1 each correspond to the sum of the lengths of the corresponding straight tube portions 21a, 21b, 22a, 22b and the corresponding bent tube portion which connects the corresponding straight tube portions 21a, 21b, 22a, 22b.

The discharge vessel 2 contains a gas, for example a noble gas which in operation serves as an electron conductor and/or electron buffer. The gas may for example be argon and/or krypton. For example 4% to 100%, for example 20% to 75%, for example around 75% krypton may be used. Alternatively or additionally, for example 20% to 90%, for example 40% to 80%, for example around 25% argon may be used. Furthermore, optionally low quantities of one, two or more further gases may be present in the discharge vessel 2. The gas may for example have a pressure between 1.5 hPa and 3 hPa, for example around 2 hPa. Furthermore, the discharge vessel 2 contains a small quantity of mercury.

FIG. 5 shows a diagrammatic section view of an exemplary embodiment of a discharge vessel 2 and/or vessel parts 21, 22 of the discharge vessel 2. The discharge vessel 2 may for example be one of the discharge vessels 2 explained above. The discharge vessel 2 or the vessel parts 21, 22 may for example have a wall thickness between 0.1 mm and 2 mm, for example between 0.2 mm and 0.8 mm.

The coating structure 7 has for example a protective coating 30 and a fluorescent coating 32. The protective coating 30 is for example formed directly on the insides 24 of the discharge vessel 2 or the insides 24 of the vessel parts 21, 22. The fluorescent coating 32 is for example formed directly on the protective coating 30. The fluorescent coating 30 has for example first fluorescent particles 34 which comprise at least one fluorescent substance emitting red light, second fluorescent particles 36 comprising at least one fluorescent substance emitting green light, and third fluorescent particles 38 comprising at least one fluorescent substance emitting blue light. The fluorescent particles 34, 36, 38 comprise the corresponding fluorescent substances or are formed therefrom. Alternatively, the coating structure 7 may comprise only one coating which serves as a protective coating 30 and fluorescent coating 32, and which for example is configured as the protective coating 30 comprising fluorescent particles 34, 36, 38. Alternatively, the coating structure 7 may have more than two, for example three, four or more layers. These additional layers may for example be further fluorescent coatings 32 and/or further protective coatings 30.

The fluorescent particles 34, 38, 36 may for example be embedded and/or integrated in a carrier material 40 or be part of a fluorescent substance mixture. The fluorescent coating 30 may for example consist of first, second and third fluorescent particles 34, 36, 38 which form a fluorescent substance mixture. The fluorescent substances may be formed crystalline and comprise host lattices. The host lattices may for example comprise or be formed from yttrium oxide. The fluorescent substances comprise activators bonded into the host lattices. For example, the fluorescent substances and in particular the host lattices are doped with the activators. The activators for example comprise rare earth metals. The activators for example comprise cerium, europium and/or terbium. For example, the host lattices may be doped with europium and/or terbium and then comprise europium or terbium. The first fluorescent particles 34 may comprise or be formed from the fluorescent substance emitting red light $Y_2O_3$:Eu. The second fluorescent particles 36 may comprise the fluorescent substance emitting green light $LaPO_4$:Ce,Tb or $LaPO_4$:Tb, referred to below as LAP, or $CeMgAl_{11}O_{19}$:Tb, referred to below as CAT. The third fluorescent particles 38 may comprise the fluorescent substance emitting blue light $BaMgAl_{10}O_{17}$:Eu, referred to below as BAM.

The first fluorescent particles 34 have a mean particle size d50 in a range from 0.5 µm to 1.9 µm, for example in a range from 1.2 µm to 1.7 µm auf. The second fluorescent particles 36, for example the LAP particles, have a mean particle size d50 in a range from 0.6 µm to 2.8 µm, for example in a range from 1 µm to 2.5 µm, for example in a range from 1.7 µm to 2.3 µm. Alternatively, the second fluorescent particles 36, for example the CAT particles, have a mean particle size d50 from 1 µm to 4 µm, for example from 1.5 µm to 3.5 µm, for example from 2.0 µm to 3.5 µm. The third fluorescent particles 38 have a mean particle size d50 in a range from 1 µm to 4 µm, for example in a range from 1.5 µm to 3.5 µm, for example in a range from 2.5 µm to 3.3 µm.

The particle sizes and in particular the mean particle sizes and in particular the d50 value of the fluorescent substances, in particular where present in pure form, are determined for example by means of a laser diffraction meter, for example a CILAS 1064 by Quantachrome. Alternatively, a laser diffusion meter may be used for measuring particle sizes and in particular the d50 value. Alternatively or additionally for example a CPS disc centrifuge may be used, for example by LOT Oriel, with a rotation speed of for example 18,000 rpm. Here particle size distributions may be determined by means of sedimentation accelerated by centrifugal force. Alternatively, the particle sizes and in particular the mean particle size and in particular the d50 value of the individual components may also be determined by means of a scanning electron microscope for the fluorescent substance mixture or the individual fluorescent particles. For this for example, the secondary electron mode is suitable.

The d50 values determined by means of the various measuring processes correspond to or may be placed in relation to each other.

The median value or d50 value, as a measure of the mean particle size, is the most important parameter, wherein 50 volume percent of the corresponding specimen are finer and the other 50% coarser than the d50. The value determined in this way is also called the volumetric d50 value. d25 and d75 are defined similarly, the comparison of d25 or d75 with d50 may give an indication of the width of the spread of particle sizes.

The proportion of activators in the fluorescent substance emitting green light may for example lie in a range from 6.5 mol % to 16 mol % for example in the case of LAP, or from 20 mol % to 50 mol % for example in the case of CAT. Alternatively or additionally, the proportion of activators in the fluorescent substance emitting red light may lie in a range from 2.3 mol % to 5.5 mol %. Alternatively or additionally, the proportion of activators in the fluorescent substance emitting blue light may lie in a range from 3.0 mol % to 11.0 mol %. The given proportions of activators each relate to a mol of the corresponding fluorescent substance.

A quantity of activators per 120 cm lamp length in the fluorescent substance emitting red light and the fluorescent substance emitting blue light, in particular a total quantity of all activators in the fluorescent substance emitting red light and the fluorescent substance emitting blue light of the low-pressure discharge lamp 1, may for example lie in a range from $4.17*10^{-5}$ mol to $3.84*10^{-4}$ mol. Alternatively or additionally, a quantity of activators in the fluorescent substance emitting green light, in particular a total quantity of all activators in the fluorescent substance emitting green light of the low-pressure discharge lamp 1, may lie in a range from $5.06*10^{-5}$ mol to $4.60*10^{-4}$ mol.

The data for the quantity of activators relate to a low-pressure discharge lamp 1 with a lamp length of around 120 cm, for example a T8 L36 W/840 low-pressure discharge lamp 1 by OSRAM. The quantities of activators may however be converted simply linearly and/or proportionally to other lamp lengths, for example to the low-pressure discharge lamps T8 L18 W by OSRAM with a lamp length of around 59 cm or T8 L58 W by OSRAM with a lamp length of around 150 cm.

Because of the small mean particle sizes of the fluorescent particles 34, 36, 38, in particular the low d50 value, the fluorescent coating 32 can be formed particularly thinly. The fluorescent coating 32 may have a thickness in a range for example from 6 µm to 22 µm, for example from 6 µm to 15 µm, for example from 6 µm to 10 µm. The thickness of the fluorescent coating 32 may however be varied, for example by the addition of fillers, additives and/or diffuser particles.

The light yield or efficiency of the low-pressure discharge lamp 1 may lie for example in a range from 70 lm/W to 120 lm/W, for example from 80 lm/W to 110 lm/W, for example from 85 lm/W to 100l m/W.

The low-pressure discharge lamp 1 may be operated with a lamp current in particular between 290 mA and 800 mA. An efficiency or light yield can be achieved for example greater than 70 lm/W, greater than 85 lm/W or greater than 95 lm/W. Alternatively, the low-pressure discharge lamp may be operated with a lower lamp current, in particular smaller than 290 mA, in particular in the range from 140 mA to 290 mA, in particular in the range from 150 mA to 200 mA. Because of the smaller lamp currents, a higher efficiency or higher light yield can be achieved, for example greater than 80 lm/W, greater than 95 lm/W or greater than 105 lm/W.

The small mean particle sizes d50 allow, even with a particularly small coating thickness, a closed fluorescent coating 32 to be formed. A doping degree, i.e. the proportion of activators per fluorescent substance, and/or a percentage proportion of activators, in particular rare earth metals, may be similar and in particular equal to a doping degree or percentage proportion of activators in known fluorescent substances. Because of the lower coating thickness necessary and the constant doping degree or percentage proportion of activators however, the necessary absolute minimum quantity of activators, in particular rare earth metals, is also reduced, which means that the low-pressure discharge lamp 1 can be produced particularly economically.

The discharge chamber, for example on the surface 7a and/or in the fluorescent coating 7, may contain optionally particles which are not visible or not shown in the figures because of their small size, and which for example may contribute to a particularly rapid reaching of the maximum luminous flux and/or to a particularly short luminous flux start-up phase. In addition, a small quantity of mercury may be present in the discharge vessel 2, for example 1 mg mercury or less, wherein the mercury may for example be partly liquid and partly gaseous when the discharge lamp 1 is switched off, and may become liquid to a smaller part and gaseous to a greater part when the discharge lamp is switched on at maximum luminous flux. The mercury may connect with the particles and/or for example form amalgam with particles comprising indium. The particles are for example metal particles and/or serve to bind mercury. For example, the metal particles comprise indium, tin, titanium, zinc, silver, gold, bismuth, aluminium or copper. The particles may for example have a mean particle size between 50 and 2000 nm, between 100 and 500 nm or between 200 and 300 nm. Amalgam-formers in the form of flags or other known embodiments may also be provided.

The protective coating 30 may for example comprise aluminium oxide and/or highly dispersed aluminium oxide, for example pyrogenic aluminium oxide. For example, the protective coating 30 may comprise 50% to 95%, for example around 70% aluminium oxide, and 5% to 50%, for example around 30% highly dispersed aluminium oxide.

The coating structure 7, in particular the protective coating 30 and/or the fluorescent coating 32, may for example be formed by mixing with a watery suspension. The watery suspension may comprise the fluorescent particles 34, 36, 38 or the material for the protective coating 30. After application of the watery suspension on the inner walls 24, this can be dried by heating, wherein the watery proportion is completely or at least largely evaporated. The coated discharge vessel 2 may be heated for example to temperatures of 500° C. to 800° C., for example from 520° C. to 650° C., for example from 530° C. to 600° C. The protective coating 30 and the fluorescent coating 32 may for example be formed in two successive procedures.

In operation of the discharge lamp 2, a voltage is applied to the contact pins 4, 5 of the discharge vessel 2. Thus an electric current flows through the gas in the discharge vessel 2 and the mercury is heated. In this way the mercury contained, for example the bonded mercury distributed on the surface 7a of the fluorescent coating 7, is rapidly transformed into its gaseous phase. The gaseous mercury atoms or molecules are excited by the energy of the electrical current and emit UV radiation evenly distributed over the discharge vessel 2, for example at a wavelength of 254 nm. The UV radiation excites the fluorescent substances of the fluorescent particles 34, 36, 38 in the fluorescent coating 32 to fluoresce. For example, the fluorescent substances of the fluorescent particles 34, 36, 38 may emit red, green or blue light, whereby for example white light can be generated.

FIG. 6 shows a diagram with a first luminous flux-weight curve 40 of a conventional low-pressure discharge lamp according to the prior art, and with a second luminous flux-weight curve 42 of an exemplary embodiment of a low-pressure discharge lamp 1, for example one of the low-pressure discharge lamps 1 described above. In the diagram, the X-axis shows the absolute total weight of the fluorescent coating 32 of the low-pressure discharge lamp 1 in grammes, and the Y-axis shows the luminous flux in lumens. Corresponding lamps, i.e. a conventional commercial T8 L36 W by OSRAM according to DIN 60081, and a lamp corresponding to this apart from the fluorescent coating, are compared.

The diagram shows that in the low-pressure discharge lamp 1, only one fluorescent coating 32 with a first weight g1 is necessary to achieve a predefined luminous flux lm0, whereas in the conventional low-pressure discharge lamp, a fluorescent coating with a higher second weight g2 is required to achieve the predefined luminous flux lm0. For the predefined luminous flux lm0 to be achieved therefore, in the low-pressure discharge lamp 1 less material is required for the fluorescent coating 32 than in the conventional low-pressure discharge lamp. The first weight g1 may for example be around 0.9 g and the second weight may for example be around 0.95 g sein. Thus in the exemplary embodiment of the low-pressure discharge lamp 1, a fluorescent coating 32 lighter by 0.05 g is sufficient to achieve the predefined luminous flux.

The conventional low-pressure discharge lamp and the exemplary embodiment of the low-pressure discharge lamp 1 may for example each have a lamp length of 120 cm and each be a T8 L36 W low-pressure discharge lamp 1 to DIN 60081. The low-pressure discharge lamps 1 may each generate light with a colour temperature of for example 4000 K. The discharge vessels 2 are filled with a filling gas mixture of argon and krypton. The relative mass proportion of argon is 25%, that of krypton 75%. The filling pressure is in each case set to around 2.1 hPa, wherein around here corresponds to an accuracy of approximately 0.2 hPa. The discharge vessels 2 have an inner diameter in a range from 24 mm to 26 mm and a glass wall thickness of the vessel parts 2, 21, 22 of around 0.75 mm.

The fluorescent substances used in the conventional T8 L36 W low-pressure discharge lamp are as follows: the fluorescent substance emitting red light $Y_2O_3$:Eu is for example doped with 6.5 w. % $Eu_2O_3$, which corresponds to a doping of 4.3 mol % europium, wherein the corresponding first fluorescent particles 34 have a mean particle size d50 of 2.8 μm. The fluorescent substance emitting green light LAP:Ce,Tb is doped with 11 w. % $Tb_2O_3$, which corresponds to a doping of 14 mol % terbium, wherein the corresponding second fluorescent particles 36 have a mean particle size d50 of 3.6 μm. The fluorescent substance emitting blue light BAM:Eu is doped with 1.4% $Eu_2O_3$, which corresponds to a doping of 6 mol % europium, wherein the corresponding third fluorescent particles 38 have a mean particle size d50 of 5.9 µm. The mass proportions per 100 g fluorescent substance mixture are 53.6 g for the fluorescent substance emitting red light, 34.9 g for the fluorescent substance emitting green light, and 11.5 g for the fluorescent substance emitting blue light. The total mass of fluorescent substance for the conventional T8 L36 W low-pressure discharge lamp is 0.95 g per discharge vessel.

The fluorescent substances used in the exemplary embodiment of the T8 36 W low-pressure discharge lamp 1 are as follows: the fluorescent substance emitting red light $Y_2O_3$:Eu is for example doped with 6.5 w. % $Eu_2O_3$, which corresponds to a doping of 4.3 mol % europium, wherein the corresponding first fluorescent particles 34 have a mean particle size d50 of 1.6 µm. The fluorescent substance emitting green light LAP:Ce,Tb is doped with 11 w. % $Tb_2O_3$, which corresponds to a doping of 14 mol % terbium, wherein the corresponding second fluorescent particles 36 have a mean particle size d50 of 2.0 µm. The fluorescent substance emitting blue light BAM:Eu is doped with 1.4% $Eu_2O_3$, which corresponds to a doping of 6 mol % europium, wherein the corresponding third fluorescent particles 38 have a mean particle size d50 of 2.8 µm. The mass proportions per 100 g fluorescent substance mixture are 54.3 g for the fluorescent substance emitting red light, 34.2 g for the fluorescent substance emitting green light, and 11.5 g for the fluorescent substance emitting blue light.

The mass of fluorescent substance for the T8 L36 W low-pressure discharge lamp 1 is 0.90 g/discharge vessel to achieve the equivalent light yield to the prior art, i.e. 0.05 g/discharge vessel less than in the corresponding conventional low-pressure discharge lamp. For example, in the low-pressure discharge lamp 1 with the fluorescent particles 34, 36, 38 with the small mean particle sizes and predefined optical properties in the starting materials, in particular the oxides to be processed, up to 4 w. % $Y_2O_3$, up to 3 w. % $Eu_2O_3$ and/or up to 18 w. % $Tb_2O_3$ can be saved.

The fluorescent coating 32 in both low-pressure discharge lamps is present on the protective coating 30 having the aluminium oxide, which for example has a total mass of around 0.47 g/discharge vessel, wherein around 30 w. % is pyrogenic aluminium oxide and 70 w. % an alpha-aluminium oxide, e.g. Baikowsky CR30F.

The photometric measurements for the luminous flux-weight curves 40, 42 were carried out according to DIN EN 60081:2010-12 for bilateral-based fluorescent lamps and the requirements defined therein for the working methods for a lamp age of 100 h.

The doping of a fluorescent substance may for example be given in mol % activator. Thus the formula of the blue fluorescent substance BAM:Eu with a doping of 6 mol % Eu may for example be written as follows $(Ba_{0.94}Eu_{0.06})MgAl_{10}O_{17}$. Here this means $BaMgAl_{10}O_{17}$ doped with 6 mol % Eu (i.e. in 1 Mol of the sum formula $BaMgAl_{10}O_{17}$, 6% of the barium atoms are replaced by Eu atoms). This corresponds to $BaMgAl_{10}O_{17}$ doped with 1.4 w.-% $Eu_2O_3$, i.e. in 100 g $BaMgAl_{10}O_{17}$ with a doping of 6 mol % Eu, 1.4 g $Eu_2O_3$ is detected by means of X-ray fluorescence analysis (RFA).

The doping may be determined subsequently for example by means of X-ray fluorescence analysis (RFA). RFA is a method of qualitative elementary analysis and very commonly used because of the low preparation complexity. The specimen is excited with energy-rich X-rays and in turn emits X-ray radiation characteristic of elements. From this spectrum or the intensity distribution of the individual signals, the percentage proportion of each element heavier than fluorine can be determined. The general standard, as applied here, is to convert these values by software such that the elements detected are indicated as weight percentages of their oxidic compound. In other words, with RFA, it is not the oxide proportions which are detected but those of the elementary activators which are then however frequently converted into corresponding oxide proportions.

Corresponding to the predefined luminous flux lm0, other predefined optical properties may be achieved, for example a predefined colour temperature and/or a predefined light yield, with the low-pressure discharge lamp 1 with less material of the fluorescent coating 23. For example, with the low-pressure discharge lamp 1, a light yield of 70 lm/W to 120 lm/W, for example from 80 lm/W to 110 lm/W, for example from 85 lm/W to 100 lm/W can be achieved. The generated light may for example have a colour temperature from 2,500 K to 8,000 K, for example from 2,500 K to 3,000 K, for example from 3,500 K to 4,200 K, for example from 5,000 K to 6,500 K.

The quantum efficiency of the fluorescent particles 34, 36, 38 may for example lie in a range from 80% to 100%, for example from 82% to 98%, for example from 83% to 92%.

An alternative is the T8 L58 W low-pressure discharge lamp to DIN 60081 with a lamp length of around 150 cm. The relative mass proportion of argon in the discharge chamber is here 25%, that of krypton 75%. The filling pressure is set to around 2.0 hPa, wherein around corresponds to an accuracy of 0.2 hPa. The discharge vessels 2 have an inner diameter in the range for example from 24 mm to 26 mm and a glass wall thickness of the vessel parts 2, 21, 22 of 0.75 mm.

The fluorescent substances used in conventional T8 L58 W low-pressure discharge lamps are for example as follows: the fluorescent substance emitting red light $Y_2O_3$:Eu is for example doped with 6.5 w. % $Eu_2O_3$, which corresponds to a doping of 4.3 mol % europium, wherein the corresponding first fluorescent particles 34 have a mean particle size d50 of 2.8 µm. The fluorescent substance emitting green light LAP:Ce,Tb is doped with 11 w. % $Tb_2O_3$, which corresponds to a doping of 14 mol % terbium, wherein the corresponding second fluorescent particles 36 have a mean particle size d50 of 3.6 µm. The fluorescent substance emitting blue light BAM:Eu is doped with 1.4% $Eu_2O_3$, which corresponds to a doping of 6 mol % europium, wherein the corresponding third fluorescent particles 38 have a mean particle size d50 of 5.9 µm. The mass proportions per 100 g fluorescent substance mixture are 53.6 g for the fluorescent substance emitting red light, 34.9 g for the fluorescent substance emitting green light, and 11.5 g for the fluorescent substance emitting blue light. The fluorescent substance mass of the conventional T8 L58 W low-pressure discharge lamp is:

0.95 g/discharge vessel*150 cm/120 cm=1.19 g/discharge vessel.

The fluorescent substances used according to the exemplary embodiment in the T8 L58 W low-pressure discharge lamp 1 are as follows: the fluorescent substance emitting red light $Y_2O_3$:Eu is for example doped with 6.5 w. % $Eu_2O_3$, which corresponds to a doping of 4.3 mol % europium, wherein the corresponding first fluorescent particles 34 have a mean particle size d50 of 1.6 µm. The fluorescent substance emitting green light $LaPO_4$:Ce,Tb is doped with 11 w. % $Tb_2O_3$, which corresponds to a doping of 14 mol % terbium, wherein the corresponding second fluorescent particles 36 have a mean particle size d50 of 2.0 µm. The fluorescent substance emitting blue light BAM:Eu is doped with 1.4% $Eu_2O_3$, which corresponds to a doping of 6 mol % europium, wherein the corresponding third fluorescent particles 38 have a mean particle size d50 of 2.8 μm. The mass proportions per 100 g fluorescent substance mixture are 54.3 g for the fluorescent substance emitting red light, 34.2 g for the fluorescent substance emitting green light, and 11.5 g for the fluorescent substance emitting blue light. The fluorescent substance mass according to the exemplary embodiment of the T8 L58 W low-pressure discharge lamp for achieving the equivalent light yield as in the prior art is:

0.90 g/discharge vessel*150 cm/120 cm=1.13 g/discharge vessel, i.e. 0.06 g/discharge vessel less than in the corresponding conventional low-pressure discharge lamp.

The fluorescent coating in both T8 L58 W low-pressure discharge lamps lies on an aluminium oxide protective coating with the total mass of around 0.5 g/discharge vessel, wherein around 30 w. % is pyrogenic aluminium oxide and 70 w. % alpha-aluminium oxide, for example Baikowsky CR30F.

A further alternative is the T5 HO54 W low-pressure discharge lamp to DIN 60081 with a lamp length of around 115 cm. The relative mass proportion of argon is here 80%, that of krypton 20%. The filling pressure is set to around 2.7 hPa, wherein around corresponds to an accuracy of 0.2 hPa. The discharge vessels 2 have an inner diameter in the range for example from 13 mm to 16 mm and a glass wall thickness of 0.6 mm.

The fluorescent substances used in conventional T5 HO54 W low-pressure discharge lamps are for example as follows: the fluorescent substance emitting red light $Y_2O_3$:Eu is for example doped with 6.5 w. % $Eu_2O_3$, which corresponds to a doping of 4.3 mol % europium, wherein the corresponding first fluorescent particles 34 have a mean particle size d50 of 2.8 μm. The fluorescent substance emitting green light LAP:Ce,Tb is doped with 11 w. % $Tb_2O_3$, which corresponds to a doping of 14 mol % terbium, wherein the corresponding second fluorescent particles 36 have a mean particle size d50 of 3.6 μm. The fluorescent substance emitting blue light BAM:Eu is doped with 1.4% $Eu_2O_3$, which corresponds to a doping of 6 mol % europium, wherein the corresponding third fluorescent particles 38 have a mean particle size d50 of 5.9 μm. The mass proportions of the fluorescent substances per 100 g fluorescent substance mixture are for example 53.6 g for the fluorescent substance emitting red light, 34.9 g for the fluorescent substance emitting green light, and 11.5 g for the fluorescent substance emitting blue light. The fluorescent substance mass of the conventional T5 HO54 W low-pressure discharge lamp is:

0.95 g/discharge vessel*115 cm/120 cm=0.91 g/discharge vessel.

The fluorescent substances used according to the exemplary embodiment in the T5 HO54 W low-pressure discharge lamp 1 are as follows: the fluorescent substance emitting red light $Y_2O_3$:Eu is for example doped with 6.5 w. % $Eu_2O_3$, which corresponds to a doping of 4.3 mol % europium, wherein the corresponding first fluorescent particles 34 have a mean particle size d50 of 1.6 μm. The fluorescent substance emitting green light $LaPO_4$:Ce,Tb is doped with 11 w. % $Tb_2O_3$, which corresponds to a doping of 14 mol % terbium, wherein the corresponding second fluorescent particles 36 have a mean particle size d50 of 2.0 μm. The fluorescent substance emitting blue light BAM:Eu is doped with 1.4% $Eu_2O_3$, which corresponds to a doping of 6 mol % europium, wherein the corresponding third fluorescent particles 38 have a mean particle size d50 of 2.8 μm. The mass proportions per 100 g fluorescent substance mixture are for example 54.3 g for the fluorescent substance emitting red light, 34.2 g for the fluorescent substance emitting green light, and 11.5 g for the fluorescent substance emitting blue light. The fluorescent substance mass according to the exemplary embodiment of the T5 HO54 W low-pressure discharge lamp for achieving the equivalent light yield as in the prior art is:

0.90 g/discharge vessel*115 cm/120 cm=0.86 g/discharge vessel, i.e. 0.05 g/discharge vessel less than in the corresponding conventional low-pressure discharge lamp.

The fluorescent coating in both low-pressure discharge lamps lies on the protective coating 30 with aluminium oxide with a total mass of around 0.1 g/discharge vessel, wherein around 99 w. % is pyrogenic aluminium oxide and 1 w. % alpha-aluminium oxide, for example Baikowsky CR30F.

The low-pressure discharge lamps 1 according to the exemplary embodiments may be produced in the same way as conventional low-pressure discharge lamps on corresponding conventional production lines.

The mean particle sizes are here determined by means of a laser diffraction meter, in particular a CILAS 1064 by Quantachrome. The volumetric d50 value is given.

The fluorescent substance mixtures used can generate light with a colour temperature of 4000 K.

Furthermore, the low-pressure discharge lamp 1 can in general be of type T8, T5, T5 HE, T5 DL, T5 HO or Dulux, Dulux L, Dulux L HE.

FIG. 7 shows a first table with exemplary ranges which each have an upper limit and a lower limit. The upper limits and lower limits relate to the proportion of activators in mol % in the corresponding fluorescent substances of an exemplary embodiment of a low-pressure discharge lamp 1, for example one of the low-pressure discharge lamps 1 described above. The proportions or quantities may for example lie in the first range, for example in the preferred second range, for example in the further preferred third range. The proportions indicate how many mol % of the corresponding activator is contained in one mol of the corresponding fluorescent substance.

FIG. 8 shows a second table with exemplary data for quantities of activators in mol per low-pressure discharge lamp 1 and with exemplary ranges which each have an upper limit and a lower limit. The upper limits and lower limits relate to the total quantity of activators of an exemplary embodiment of a low-pressure discharge lamp 1 with lamp length 120 cm, for example one of the low-pressure discharge lamps 1 described above. The total quantities may for example lie in the first range, for example in the preferred second range, for example in the further preferred third range. The upper and lower limits are given for low-pressure discharge lamps 1 with different light yields and lamp currents, for example discharge currents. The low-pressure discharge lamps 1 generate light with a colour temperature from 3,500 K to 4,200 K and the fluorescent substance emitting green light comprises LAP.

FIG. 9 shows a third table with exemplary data for quantities of activators in mol per low-pressure discharge lamp 1 and with exemplary ranges which each have an upper limit and a lower limit. The upper limits and lower limits relate to the total quantity of activators of an exemplary embodiment of a low-pressure discharge lamp 1 with lamp length 120 cm, for example one of the low-pressure discharge lamps 1 described above. The total quantities may for example lie in the first range, for example preferably in the second range, for example further preferably in the third range. The upper and lower limits are given for low-pressure discharge lamps 1 with different light yields and lamp currents, for example discharge currents. The low-pressure discharge lamps 1 generate light with a colour temperature from 3,500 K to 4,200 K and the fluorescent substance emitting green light comprises CAT.

FIG. 10 shows a fourth table with exemplary data for quantities of activators in mol per low-pressure discharge lamp 1 and with exemplary ranges which each have an upper limit and a lower limit. The upper limits and lower limits relate to the total quantity of activators of an exemplary embodiment of a low-pressure discharge lamp 1 with lamp length 120 cm, for example one of the low-pressure discharge lamps 1 described above. The total quantities may for example lie in the first range, for example preferably in the second range, for example further preferably in the third range. The upper and lower limits are given for low-pressure discharge lamps 1 with different light yields and lamp currents, for example discharge currents. The low-pressure discharge lamps 1 generate light with a colour temperature from 2,500 K to 3,200 K and the fluorescent substance emitting green light comprises CAT and/or LAP.

FIG. 11 shows a fifth table with exemplary data for quantities of activators in mol per low-pressure discharge lamp 1 and with exemplary ranges which each have an upper limit and a lower limit. The upper limits and lower limits relate to the total quantity of activators of an exemplary embodiment of a low-pressure discharge lamp 1 with lamp length 120 cm, for example one of the low-pressure discharge lamps 1 described above. The total quantities may for example lie in the first range, for example preferably in the second range, for example further preferably in the third range. The upper and lower limits are given for low-pressure discharge lamps 1 with different light yields. The low-pressure discharge lamps 1 generate light with a colour temperature from 5,000 K to 6,500 K and the fluorescent substance emitting green light comprises CAT and/or LAP.

The invention is not restricted to the exemplary embodiments given. For example, the low-pressure discharge lamp 1 may have more or fewer vessel parts 21, 22. Furthermore, the fluorescent particles 34, 36, 38 may be formed from chemical elements other than those cited above.

The invention claimed is:

1. Low-pressure discharge lamp, with a discharge vessel and a coating structure formed on an inside of the discharge vessel, the coating structure comprising:
   first fluorescent particles which have a least one fluorescent substance emitting red light and the mean particle size of which lies in a range from 0.5 µm to 1.9 µm,
   second fluorescent particles which have at least one fluorescent substance emitting green light and the mean particle size of which lies in a range from 0.6 µm to 2.8 µm or from 1 µm to 4 µm, and
   third fluorescent particles which have at least one fluorescent substance emitting blue light and the mean particle size of which lies in a range from 1 µm to 4 µm;
   wherein the fluorescent substances each comprise activators and host lattices doped with the activators, wherein
   a proportion of the activators in the fluorescent substance emitting green light lies in the range from 6.5 mol % to 16 mol % or from 20 mol % to 50 mol %,
   a proportion of the activators in the fluorescent substance emitting red light lies in the range from 2.3 mol % to 5.5 mol %, and/or
   a proportion of the activators in the fluorescent substance emitting blue light lies in the range from 3.0 mol % to 11.0 mol %.

2. Low-pressure discharge lamp according to claim 1, wherein
   the mean particle size of the first fluorescent particles lies in a range from 1.2 µm to 1.7 µm, and/or
   the mean particle size of the second fluorescent particles lies in a range from 1 µm to 2.5 µm or from 1.5 µm to 3.5 µm, and/or
   the mean particle size of the third fluorescent particles lies in a range from 1.5 µm to 3.5 µm.

3. Low-pressure discharge lamp according to claim 2, wherein
   the mean particle size of the second fluorescent particles lies in a range from 1.7 µm to 2.3 µm or from 2.0 µm to 3.4 µm, and/or
   the mean particle size of the third fluorescent particles lies in a range from 2.5 µm to 3.3 µm.

4. Low-pressure discharge lamp according to claim 1, wherein
   a quantity of activators per 120 cm lamp length in the fluorescent substance emitting red light and the fluorescent substance emitting blue light lies in a range from $4.17*10^{-5}$ mol to $3.84*10^{-4}$ mol, and/or
   a quantity of activators per 120 cm lamp length in the fluorescent substance emitting green light lies in a range from $5.06*10^{-5}$ mol to $4.60*10^{-4}$ mol.

5. Low-pressure discharge lamp according to claim 1, wherein the activators comprise rare earth metals.

6. Low-pressure discharge lamp according to claim 5, wherein the activators comprise europium and/or terbium.

7. Low-pressure discharge lamp according to claim 1, wherein the coating structure comprises
   a protective coating formed on an inside of the discharge vessel, and
   a fluorescent coating formed on the protective coating and comprising the fluorescent particles.

8. Low-pressure discharge lamp according to claim 7, wherein the protective coating comprises aluminium oxide and/or pyrogenic and/or highly dispersed aluminium oxide.

9. Low-pressure discharge lamp according to claim 1 which in operation emits white light.

10. Low-pressure discharge lamp according to claim 1 which in operation has discharge currents in the range from 140 mA to 800 mA.

11. Low-pressure discharge lamp according to claim 1 wherein the light yield lies in a range from 70 lm/W to 120 lm/W.

12. Low-pressure discharge lamp according to claim 1 wherein a colour temperature of the generated light lies in the range from 2,500 K to 6,500 K.

13. Low-pressure discharge lamp according to claim 1 wherein the quantum efficiency of the fluorescent substances lies in a range from 80% to 100%.

* * * * *